(12) United States Patent
Agarwal et al.

(10) Patent No.: US 12,248,781 B1
(45) Date of Patent: Mar. 11, 2025

(54) DECENTRALIZED NETWORK BASED COMPUTING SERVICES

(71) Applicant: Amazon Technologies, Inc., Seattle, WA (US)

(72) Inventors: Aman Agarwal, Gurgaon (IN); Gaurav Virdy, Gurugram (IN); Priya Aneja, Faridabad (IN); Prince Batra, Yamuna Nagar (IN)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 18/083,054

(22) Filed: Dec. 16, 2022

(51) Int. Cl.
*G06F 8/40* (2018.01)
*G06F 8/77* (2018.01)

(52) U.S. Cl.
CPC . *G06F 8/77* (2013.01); *G06F 8/40* (2013.01)

(58) Field of Classification Search
CPC .................................. G06F 8/40; G06F 8/77
See application file for complete search history.

(56) References Cited

U.S. PATENT DOCUMENTS

| | | | |
|---|---|---|---|
| 2020/0133658 A1* | 4/2020 | Agrawal | G06F 8/36 |
| 2020/0394588 A1* | 12/2020 | Sanchez | G06F 8/75 |
| 2023/0077289 A1* | 3/2023 | Sloane | G06F 16/24578 |

* cited by examiner

*Primary Examiner* — Hanh Thi-Minh Bui
(74) *Attorney, Agent, or Firm* — Kilpatrick Townsend & Stockton LLP

(57) ABSTRACT

Users propose, review, reject, comment on, and approve rules or program code to implement rules in a decentralized network. When the users act on proposed rules, they are credited with member scores according to their contributions. The rules are used to calculate, for example, obligations for a user. When the network is used to calculate a result, the use of the rules for calculating the result are used to determine a score for the users who contributed to the rules.

20 Claims, 4 Drawing Sheets

DECENTRALIZED NETWORK BASED COMPUTING SERVICES

BACKGROUND

Electronic applications may be used to determine and calculate an obligation for one or more requirement causing events. For example, income, property, sales, value added, and other taxes require a user to calculate the correct legal requirement, and electronic applications may be used for the calculations. In addition, one or more entities instrumental in making the electronic applications available should be acknowledged. Effective electronic requirement calculation applications and acknowledgment attribution systems are needed in the art.

BRIEF DESCRIPTION OF THE DRAWINGS

Various embodiments in accordance with the present disclosure will be described with reference to the drawings, in which.

DETAILED DESCRIPTION

Figure 1:
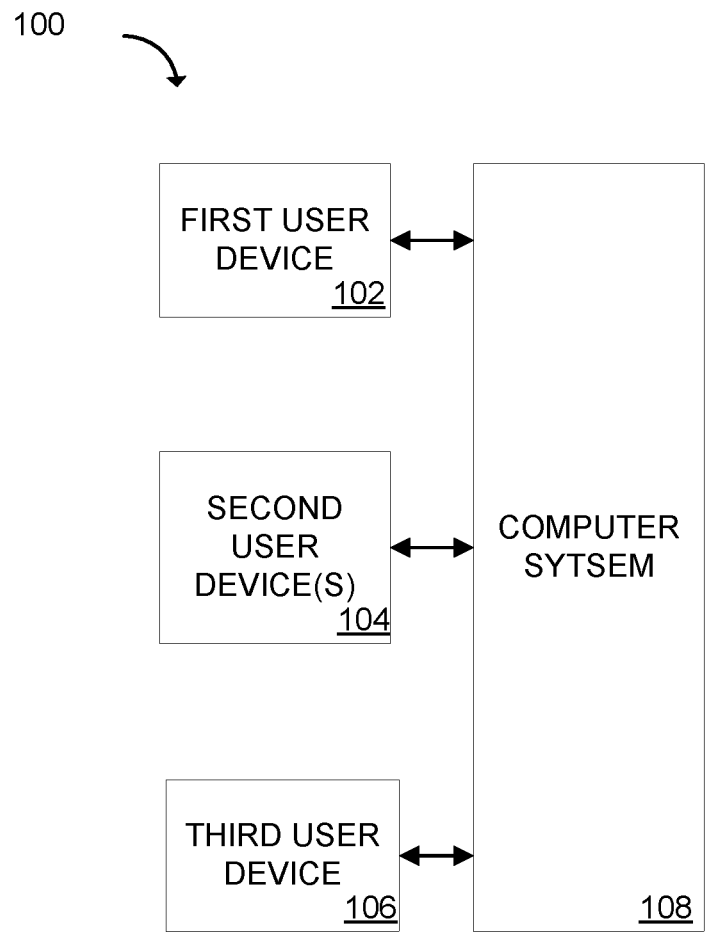
FIG. 1 illustrates an example block diagram of a system for generating and reporting obligations and contribution scores according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to a platform that enables the creation of a library of program codes executable to provide a computing service. Each program code, which may be referred to herein also as a program code section, can be defined based on user input from, for example, one of a large number of code-defining users, generated or accepted upon a proposal, review, and approval process, and integrated with other program codes in the library that define inter-dependencies and application programming interfaces (APIs) between the program codes. The definitions of program codes, interactions to generate and/or modify the library, and the use of the program codes and/or library can be recorded using a decentralized system, such as one using Blockchain technology.

Such embodiments provide several technical advantages over conventional systems for creating a software library. In one example, it may be sufficient to define parameters and functions for a program code and/or upload the program code itself, whereby the platform can generate (as applicable) and integrate the program code with other program codes in the library based on the inter-dependencies and APIs. In another example, the library itself is inherently secure because each program code and each step and input of the proposal, review, and approval process can be recorded in the decentralized system (e.g., a Blockchain network) that provides a mechanism for detecting improper alterations. As such, improper definitions and/or compromised program codes can be easily tracked, detected, and removed. Furthermore, the use of the decentralized system enables version controls of the program codes also in a secure and auditable manner. In particular, any update and/or use of a program code can be recorded and easily tracked. In contrast, in conventional systems, the integration of program codes (if any) is more challenging and complex, and such systems are not as secure and version controlled. These and other technical improvements are further described herein below. In addition, because each step and input of the proposal, review, and approval process can be recorded in the decentralized system along with identification of the source or responsible entity of each action in the process, appropriate acknowledgement may be attributed to each contributing party, for example, based on their contribution.

The inventive subject matter, in some embodiments, leverages a decentralized system (e.g., Web3, etc.) called non-fungible tokens (NFTs). NFT technologies are built on similar technologies as cryptocurrency distributed or notarized ledgers (e.g., BitCoin, DogeCoin, Ethereum, Solana, Polygon, Polkadot, Cosmos, Avalanche, Hyperledger, Hash Graph, etc.). Where cryptocurrencies use fungible tokens that are equivalent to each other, some systems use NFTs representing single tokens that may be unique. NFTs have been used as digital assets that represent artwork and have been bought and sold. As can be appreciated, use of NFTs to digitally represent artwork can be lucrative. However, NFTs are often misunderstood to be the artwork itself. Instead, NFTs typically represent a transaction related to the artwork rather than the artwork itself. Thus, NFTs can be considered, in many cases, an indirect representation of the artwork. Still, digital data associated with an NFT (e.g., an image of artwork, music, sound video, performance, etc.) may be stored in a ledger to be accessed by the owner of the NFT.

NFTs can be created (i.e., typically called "minting"), bought, sold, auctioned, burned, or otherwise managed as digital objects with respect to one or more corresponding notarized ledgers. NFTs can be managed, for example, with the use of existing smart contracts that may follow token standards such as via Ethereum or other smart contract standards. The Ethereum smart contract ecosystem has multiple standards by which tokens may be managed including ERC-20, which represents fungible tokens; cryptocurrency coins for example. ERC-721 defines interfaces by which one may manage NFTs via smart contracts. According to ERC-721 transactions relating to an NFT (e.g., minting, transfers, burning, etc.) are recorded on the Ethereum blockchain to retain a ledger of all desired actions or transactions associated with the NFT. Further ERC-998 defines interfaces for creating tokens comprising sub tokens and vice versa. ERC-1155 also defines interfaces by which one can create token sets. As individuals interact with Ethereum tokens via one or more transactions, the transactions are recorded on the Ethereum blockchain thereby forming an immutable ledger of the existence and history of such tokens. While Ethereum is referenced for illustrative purposes, the inventive subject matter is not so limited. Each notarized ledger technology may have its own standardized interfaces and rules by which tokens are managed. Other standards are possible and NFTs or ledger tokens used in embodiments of the present disclosure can abide to such standards including any or a combination of NEO standards (NEP5, NEP11, etc.), TREZOS standards (TZIP7, TZIP12, etc.), EOS standards, FLOW standards, or other existing standards and those yet to be created. It should be appreciated that terms such as "tokens,"

"digital tokens," "NFTs," and are with reference to their corresponding underlying notarized ledger technology and are not limited to Ethereum or any particular standards.

Various embodiments of the present disclosure may use the NFT infrastructure for purposes beyond buying and selling artwork. The inventive subject matter presented below leverages NFTs (or, more generally, digital tokens) in a novel and new way. More specifically, a digital token can still be used to protect a digital asset or corresponding real-world asset. For example, an NFT can protect the ownership of the digital asset by indicating the ownership and allowing the verification thereof. Nonetheless, the digital token can, in some embodiments, depend on other digital tokens. For instance, during the process of generating a digital token (e.g., minting an NFT, instantiating an NFT, etc.), a similarity of the to-be-generated digital token to other existing digital tokens can be assessed. Depending on the similarity and program codes (e.g., smart contracts in the NFT case, APIs, RPCs, etc.) associated with a similar, existing token(s) and/or the to-be-generated token, alterations may be made to the digital asset, or a permission may be made to use the unaltered digital asset. Such cross-token management does not stop at the creation stage. Further, it can be extended all the way through the token's lifecycle until the digital token is removed (e.g., the NFT is burned, deleted, deconstructed, etc.).

In order to comply with legal requirements, a user may use a software application to calculate their obligation. Because the requirements are complex a high burden is placed on the software application to accurately represent all of the requirements for a large number of circumstances. A distributed network of consortium members, each contributing to the software application, provides an effective way to manage the complexity of the software application. In some embodiments, a number of consortium members each propose rules as smart contracts on a blockchain network, where each proposed rule represents a small portion of the requirements. The proposed rules or smart contracts encoding the rules may be reviewed, revised, and/or approved by other consortium members as a requirement for the proposed rules to be included in the blockchain network of the software application. The proposal/approval process for the rules may be included in the blockchain network of the software application, or may be included in a separate blockchain network. As the software application is used to calculate obligations, the blockchain network of the software application calculates the obligations for the users according to the approved and implemented rules. In addition, as the software application is used to calculate obligations, the blockchain network for the software application also calculates acknowledgment credits for the consortium members according to their contributions, for example in proposing, reviewing, revising, approving, and/or implementing the smart contracts corresponding with the rules.

Governments require collections for their existence and hence put tight controls on compliance which in turn is increasing the burden of compliance for organizations. Part of this burden is coming from (1) use of software that needs to be frequently updated to represent modified collection requirements, (2) perform internal/external verifications of the compliance activities as interpretation of the requirements is complex, (3) remediate results of the verification efforts, which includes resolving different interpretations of the requirements and corrections to previous compliance efforts, and (4) staying up to date with the latest changes in requirements, which may change very frequently.

The burden of compliance is mounting pressures on obligated entities and diverts their attention from other objectives to managing the requirements and compliance. This is not also in favor of governments as this is making them unpopular.

Embodiments discussed herein provide a compliance solution using a blockchain network, where compliance rules are managed with smart contract generated by rule contributors participating in the blockchain. As a transaction is conducted on the network, the associated smart contract identifies the correct requirement, and, in some embodiments, compliance action is taken. The members of the blockchain network, manage the compliance rules of the blockchain network to ensure compliance with requirements, and, therefore, act as a consortium where each member is acknowledged for their participation, for example, by earning credits having a generally accepted value, such as an amount of money. In some embodiments, each particular member receives credit as a portion of every transaction processed by the blockchain network, where the received credit is based on a level of participation of the particular member. In some embodiments, the level of participation is related to creation and management activities of the blockchain network, such as managing the technology, adding, or removing new rules, approving/rejecting rules and the smart contracts executed for the rule.

The blockchain based smart contracts help reduce the burden of compliance as they do not need to deploy experts to interpret every changing requirement. In addition, compliance verification efforts become much simpler as the blockchain network provides transparency and traceability.

Members of a consortium manage the blockchain network. These consortium members have access to resources and mechanisms to understand the requirements and to build, propose and approve smart contracts which implement rules corresponding with the requirements on the blockchain network. In some embodiments, any entity who has the necessary support and resources to understand the compliance requirements can join the consortium.

Consortium members may be responsible for understanding the compliance requirements and for proposing smart contracts implementing blockchain network rules according to the compliance requirements. Consortium members may additionally or alternatively be responsible for reviewing and approving or rejecting the proposed smart contracts.

In some embodiments, the consortium members are acknowledged according to the actions they perform in support of the network, such as proposing, reviewing, approving, and rejecting smart contracts. The consortium members may perform other actions in support of the design, establishment, maintenance, or operation of the blockchain network for which they are acknowledged.

In some embodiments, one of the consortium members adds a proposed rule as smart contract on the blockchain network. Once a rule is added, other consortium members review and approve or reject the proposed rule. In some embodiments, the other consortium members make approve or reject the proposed rule with comments, for example suggesting changes. Once approved, the smart contract encoding the proposed rule is added to the blockchain network.

In some embodiments, whenever a new transaction is executed on the blockchain network, the smart contract system causes the smart contracts relevant to the transaction to operate. Because the transaction and the actions taken as a result of the operation of the relevant smart contracts are implemented in the blockchain network, compliance with the regulations corresponding with the relevant smart contracts is recorded and provide transparency to the parties involved in transaction or who otherwise have access to the information recorded in the blockchain network.

In some embodiments, based on policy, consortium members earn, for example, from every transaction executed according to their contribution. Accordingly, the policy may encourage the members of the consortium to actively participate to build better smart contracts which more accurately and correspond with and provide compliance with the regulations. As an example, when a new transaction is executed on the blockchain network, a percentage, for example 0.01% of the transaction may be charged. The percentage may be apportioned to consortium members based on their contributions and to the blockchain network owner.

In some embodiments, a computing service is used to make calculations based on rules implemented, for example, in program code sections, for example, in a decentralized network. In some embodiments, the rules correspond with regulations, such as regulations related to legal obligations, although in some embodiments, the rules correspond with other types of requirements or with other types of calculations to be made. Accordingly, the rules discussed herein are not limited to the specific examples which are discussed. In some embodiments, the regulations correspond with legal obligations to pay a tax, although the regulations may correspond, for example, with other legal or non-legal obligations or requirements. Accordingly, the regulations discussed herein are not limited to the specific examples which are discussed. In some embodiments, the program code sections correspond with smart rules, although the program code sections are not limited to that specific example. In some embodiments, the decentralized network is a blockchain network, although the decentralized network is not limited to that specific example.

In some embodiments, by interacting with a computer system, a consortium of users or members establish the rules for the decentralized network, and a number of clients interact with user devices to access the computing service of the decentralized network to determine and obligation the clients have based on the circumstances the clients have experienced. To establish the rules, for example, a first consortium member interacts with the computer system to propose a rule, and one or more other consortium members interact with the computer system to review the proposed rule. The other consortium members may also interact with the computer system to approve the proposed rule, comment on the proposed rule, provide suggestions for modifications to the proposed rule, and approve the proposed rule.

The computer system determines whether the proposed rule may be added to the computing service of the decentralized network based on approval requirements. If the computer system determines that the proposed rule has met the approval requirements, the computer system adds a program code section corresponding with the proposed rule to a library of program code sections of the computing service in the decentralized network.

In addition, the computer system maintains a member score for each of the members of the consortium for each approved rule, where the member score for each particular member of the consortium corresponds with contributions the particular member has made toward the computing service. For example, the member score of each particular member of the consortium for each particular rule may correspond with the particular member's activities regarding, for example, one or more of establishing, proposing, reviewing, commenting on, revising, approving each of the rules of the computing service, and other activities for the computing service or for the particular rule of the computing service.

In some embodiments, a client interacts with one or more user devices to access the computing service of the decentralized network, and to transmit a request to the computing service to cause the computing service to determine and obligation the client has. The request and optionally subsequent communications provide sufficient information for the computing service to determine the obligation for the client. The computer system operating the computing service uses the information of the request and any subsequent communications to select one or more programming code sections from the library of programming code sections to use for calculating the obligation. In addition, the computing service calculates the obligation by executing the selected programming code sections.

In addition, in some embodiments, the computing service calculates a contribution score, such as a compensation, for each of the consortium members associated with the rules used by the computing service to calculate the obligation. For example, each of first and second consortium members may have been involved in establishing the rules used by the computing service to calculate the obligation, and the computing service may calculate a contribution score for each of the first and second consortium members. In some embodiments, the contribution scores are calculated based at least in part on the member scores of each of the first and second consortium members. For example, a total contribution score may be apportioned to each of the first and second consortium members according to the member scores of the first and second consortium members.

FIG. 1 illustrates an example block diagram of a system 100 for generating and reporting client obligations and consortium member contribution scores according to some embodiments. The system includes a first user device 102, one or more second user devices 104, a third user device 106, and a computer system 108.

The first user device 102 is communicatively coupled with the computer system 108 for example by a network, such as the Internet. The first user device 102 is associated with a first member of the consortium. In response to certain interactions between the first user device 102 and the first consortium member, the first user device 102 is configured to transmit data to the computer system 108, where the data indicates a proposed rule or indicates a proposed program code section representing a proposed rule. In some embodiments, the proposed rule corresponds with one or more regulations. For example, the first user may be an expert or may be sufficiently competent and familiar with the regulations to effectively propose rules and/or program code sections representing rules.

The computer system 108 receives the data indicating the proposed rule or the proposed program code section representing the proposed rule from the first user device 102. In some embodiments, in response to receiving the data, or because of receiving the data, the computer system 108 may store information indicating the proposed rule or the proposed program code section representing the proposed rule and various aspects thereof in a memory. For example, in some embodiments, the computer system 108 may record the information indicating the proposed rule or the proposed program code section representing the proposed rule and its various aspects in the decentralized network, where the recorded information indicates the first user as a source of the proposed rule or the proposed program code section representing the proposed rule. In some embodiments, in response to receiving the data, or because of receiving the data, the computer system 108 may increase a member score of a user account of the first user. In some embodiments, in response to receiving the data, or because of receiving the data, the computer system 108 may store information indicating the increased member score in a memory. For example, in some embodiments, the computer system 108 may record the increased member score in the decentralized network.

In some embodiments, in response to receiving the data, or because of receiving the data, the computer system 108 transmits data indicating the proposed rule or the proposed program code section representing the proposed rule to one or more second user devices 104. The second user devices 104 are communicatively coupled with the computer system 108 for example by a network, such as the Internet. The second user devices 104 are each associated with a particular second member of the consortium.

In some embodiments, the second user devices 104 are configured to receive the data indicating the proposed rule or the proposed program code section representing the proposed rule transmitted from the computer system 108. In response to receiving the data from the computer system 108, the second user devices 104 are configured to present information to the second users representing the proposed rule or the proposed program code section representing the proposed rule.

In some embodiments, each of the second user devices 104, in response to interactions with one of the second users, is configured to transmit data representing consortium member responses to the presented information. In some embodiments, the consortium member responses may include one or more of a comment, an indication that the presented information has been reviewed, a rejection of the proposed rule or the proposed program code section representing the proposed rule, a suggestion for changing the proposed rule or the proposed program code section representing the proposed rule, and an approval of the proposed rule or the proposed program code section representing the proposed rule. In some embodiments, the consortium member responses may include one or more other types of information.

The computer system 108 is configured to receive the data representing the consortium member responses. In some embodiments, in response to receiving the data representing the consortium member responses, or because of receiving the data, the computer system 108 may increase a member score of a user account of each the second users from which member responses are received. In some embodiments, the member scores are increased according to what type of member response is received. For example, the member score of a user account of a second user providing a suggestion may be increased more than the member score of a user account of a second user providing an indication that the proposed rule or the proposed program code section representing the proposed rule has been reviewed. In some embodiments, in response to receiving the data, or because of receiving the data, the computer system 108 may store information indicating the increased member scores in a memory. For example, in some embodiments, the computer system 108 may record the increased member scores in the decentralized network.

In some embodiments, in response to receiving the data representing the consortium member responses, or because of receiving the data, the computer system 108 may decrease a member score of a user account of either the first user or one of the second users. For example, a member score of the first user may be decreased in response to receiving a remember response from a second user rejecting the proposed rule or the proposed program code section representing the proposed rule. In some embodiments, in response to receiving the data, or because of receiving the data, the computer system 108 may store information indicating the decreased member scores in a memory. For example, in some embodiments, the computer system 108 may record the decreased member scores in the decentralized network.

In some embodiments, the computer system 108 is configured to process each of the member responses received from the second user devices 104. For example, the computer system 108 may be configured to process a member response comprising a comment by transmitting data representing the comment to the first user device 102. In some embodiments, in response to receiving the member responses including comments, or because of receiving the member responses including comments, the computer system 108 may store information indicating the comments and the source of the comments in a memory. For example, in some embodiments, the computer system 108 may record information indicating the comments and the source of the comments in the decentralized network.

In some embodiments, the computer system 108 may be configured to process a member response comprising an indication that the proposed rule or proposed program code section representing the proposed rule has been reviewed by a particular second user by transmitting data indicating that the comment has been reviewed by the particular second user to the first user device 102. In some embodiments, in response to receiving the member responses including indications that the proposed rule or proposed program code section representing the proposed rule has been reviewed by particular second users, or because of receiving the member responses including indications that the proposed rule or proposed program code section representing the proposed rule has been reviewed by particular second users, the computer system 108 may store information indicating that the proposed rule or proposed program code section representing the proposed rule has been reviewed by the particular second users. For example, in some embodiments, the computer system 108 may record information indicating the member responses and the source of the member responses in the decentralized network.

In some embodiments, the computer system 108 may be configured to process a member response comprising a rejection of the proposed rule or proposed program code section representing the proposed rule from a particular second user by transmitting data indicating that the proposed rule has been rejected by the particular second user to the first user device 102. In some embodiments, in response to receiving the member responses including indications that the proposed rule or proposed program code section representing the proposed rule has been rejected by particular second users, or because of receiving the member responses including indications that the proposed rule or proposed program code section representing the proposed rule has been rejected by particular second users, the computer system 108 may store information indicating that the proposed rule or proposed program code section representing the proposed rule has been rejected by the particular second users. For example, in some embodiments, the computer system 108 may record information indicating the rejections and the source of the rejections in the decentralized network.

In some embodiments, the computer system 108 may be configured to process a member response comprising a suggestion for improving the proposed rule or proposed program code section representing the proposed rule from a particular second user by transmitting data indicating the suggestion from the particular second user to the first user device 102. In some embodiments, in response to receiving the member responses including such suggestions, or because of receiving the member responses including such suggestions, the computer system 108 may store information indicating the suggestions and the sources of the suggestions. For example, in some embodiments, the computer system 108 may record information indicating the suggestions and the sources of the suggestions in the decentralized network.

In some embodiments, the computer system 108 may be configured to process a member response comprising an approval of the proposed rule or proposed program code section representing the proposed rule from a particular second user by transmitting data indicating that the proposed rule has been accepted by the particular second user to the first user device 102. In some embodiments, in response to receiving the member responses including indications that the proposed rule or proposed program code section representing the proposed rule has been approved by particular second users, or because of receiving the member responses including indications that the proposed rule or proposed program code section representing the proposed rule has been approved by particular second users, the computer system 108 may store information indicating that the proposed rule or proposed program code section representing the proposed rule has been approved by the particular second users. For example, in some embodiments, the computer system 108 may record information indicating the approvals and the source of the approvals in the decentralized network.

In some embodiments, the computer system 108 may be configured to process a member response comprising an approval of the proposed rule or proposed program code section representing the proposed rule from a particular second user by determining whether an approval condition has been met for the proposed rule or proposed program code section representing the proposed rule. For example, in order to implement the proposed rule, approval from all consortium members may be needed. In alternative embodiments, in order to implement the proposed rule, approval from a majority or a super majority of consortium members may be needed. In some embodiments, in order to implement the proposed rule, approval from all, a majority, or a super majority of a list of particular consortium members may be needed. In some embodiments, in order to determine whether the approval condition has been met, the computer system 108 accesses data representing previously received approvals and determines whether the previously received approvals is sufficient for the approval condition to have been met.

In some embodiments, the computer system 108 may be configured to, in response to determining that the approval condition has been met, add an operative program code section corresponding with the proposed rule or proposed program code section representing the proposed rule to a library of operative program code sections in the decentralized network. In some embodiments, adding the operative program code section to the library of operative program code sections in the decentralized network comprises saving the operative program code section in the decentralized network and associating the operative program code section with one or more application programing interfaces (APIs) such that the operative program code section is executable using the decentralized network based at least in part on an API call.

In some embodiments, the computer system 108 may be configured to, in response to determining that the approval condition has been met, calculate normalized member scores for the consortium members based on the consortium member scores increased and decreased in response to the particular member's activities regarding, for example, one or more of establishing, proposing, reviewing, commenting on, revising, approving each of the rules of the computing service, and other activities for the computing service or for the particular rule of the computing service.

The third user device 106 is communicatively coupled with the computer system 108 for example by a network, such as the Internet. The third user device 106 is associated with a client. In response to certain interactions between the third user device 106 and the client, the third user device 106 is configured to transmit data to the computer system 108, where the data indicates a request for a computing service. For example, the data may indicate a request for calculation of an obligation. In some embodiments, the data also indicates information relevant to calculating the results expected from the computing service, as understood by those of skill in the art.

The computer system 108 is configured to, in response to receiving the request and any information relevant to calculating the results expected from the request, select one or more operative program code sections in the library of operative program code sections. In some embodiments, the selected operative program code sections are those operative program code sections in the library which may be or which are to be used to fulfill the request based at least in part on the information relevant to calculating the results expected from the computing service request.

In addition, in response to receiving the request and any information relevant to calculating the results expected from the request, the computer system 108 is configured to execute the selected operative program code sections to generate a result corresponding with the request for computing service. In addition, the computer system 108 is configured to transmit data corresponding with the result to the third user device 106.

In response to one or more of selecting and executing the selected operative program code sections, computer system 108 is configured to calculate a contribution score for the member accounts of each of the members of the consortium who are associated with member scores or normalized member scores for the selected operative program code sections as a result of the consortium member's activities related to the selected operative program code sections. For example, the member scores or normalized member scores for each of the selected or executed operative program code sections may be accessed and may be used to calculate a contribution score for each of the relevant consortium member accounts.

In some embodiments, each of the selected operative program code sections has a relative contribution scoring weight, and the member scores or normalized member scores for each of the selected operative program code sections are adjusted, for example by being multiplied by the corresponding weight. In some embodiments, the adjusted member scores or normalized member scores associated with each of the selected operative program code sections for each particular relevant consortium member are summed. Accordingly, all of the member scores or normalized member scores related the selected operative program code sections for each relevant consortium member related the selected operative program code sections are summed. In some embodiments, the summed adjusted member scores or normalized member scores of all relevant consortium members are normalized, and a normalized contribution score is generated for each relevant consortium member. In some embodiments, the normalized contribution scores are used to calculate compensation for the relevant consortium members, for example, by multiplying each of the normalized contribution scores by a total compensation for the relevant consortium members for the performance of the computing service.

Figure 2:
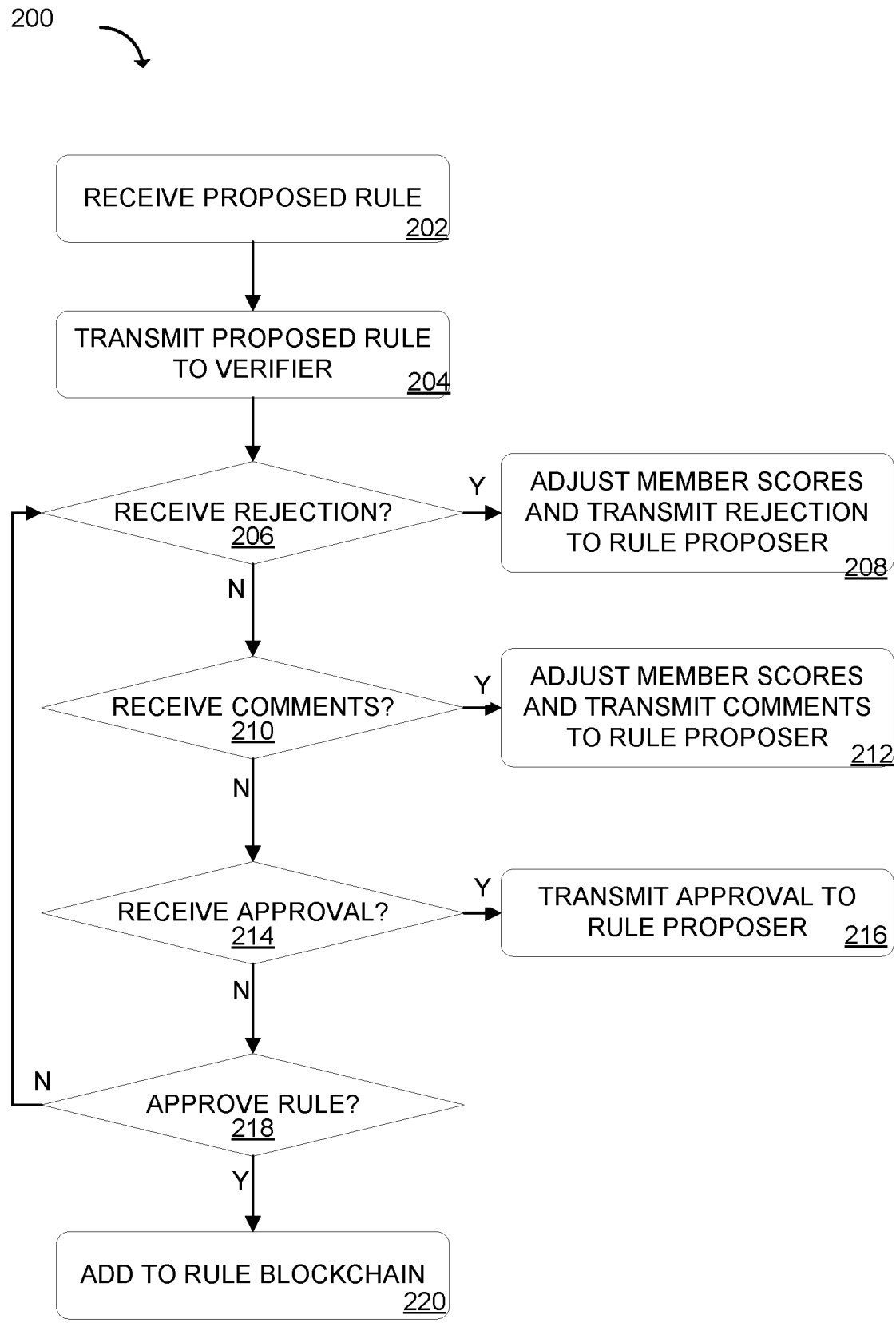
FIG. 2 illustrates an example method for generating a computing service according to some embodiments.

FIG. 2 illustrates an example method 200 for generating a computing service according to some embodiments. Some or all of the method 200 (or any other methods described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The method 200 may, for example, be performed by computer system 108, discussed above.

At 202, the computer system receives data indicating a proposed rule or a proposed program code section representing the proposed rule, for example, from a first user device. In some embodiments, in response to receiving the data, or because of receiving the data, the computer system 108 may record the information indicating the proposed rule or the proposed program code section representing the proposed rule and its various aspects in the decentralized network, where the recorded information indicates a first user, associated with the first user device, as a source of the proposed rule or the proposed program code section representing the proposed rule. In some embodiments, in response to receiving the data, or because of receiving the data, the computer system may increase a member score of a user account of the first user. In some embodiments, in response to receiving the data, or because of receiving the data, the computer system may record the increased member score in the decentralized network.

At 204, the computer system transmits data indicating the proposed rule or the proposed program code section representing the proposed rule to one or more second user devices, each associated with a particular second member of the consortium.

At 206, the computer system determines whether a member response received from one of the second user devices includes a rejection of the proposed rule or the proposed program code section representing the proposed rule. If the received member response does not include such a rejection, method 200 continues to 210.

If the received member response does include such a rejection, at 208, in response to receiving the rejection, the computer system may increase a member score of a user account of the second user from which the rejection is received. In some embodiments, the computer system may record the increased member scores in the decentralized network. In some embodiments, in response to receiving the rejection, the computer system may decrease the member score of the user account of the first user. In some embodiments, the computer system may record the decreased member scores in the decentralized network. In some embodiments, the computer system may transmit data representing the rejection to the first user device. In some embodiments, the computer system may record information indicating the rejection and the source of the rejection in the decentralized network.

At 210, the computer system determines whether a member response received from one of the second user devices includes a comment on the proposed rule or the proposed program code section representing the proposed rule. If the received member response does not include such a comment, method 200 continues to 214.

If the received member response does include such a comment, at 212, the computer system may transmit data representing the comment to the first user device. In some embodiments, the computer system may record information indicating the comments and the source of the comments in the decentralized network. In some embodiments, in response to receiving the comment, the computer system may increase the member score of the user account of the second user providing the comment. In some embodiments, the computer system may record the increased member score in the decentralized network.

At 214, the computer system determines whether a member response received from one of the second user devices includes an approval of the proposed rule or the proposed program code section representing the proposed rule. If the received member response does not include such an approval, method 200 continues to 218.

If the received member response does include such an approval, at 216, the computer system transmits data indicating that the proposed rule has been accepted by the particular second user to the first user device. In some embodiments, the computer system may record information indicating the approval and the source of the approval in the decentralized network.

At 218, the computer system determines whether an approval condition has been met for the proposed rule or proposed program code section representing the proposed rule. For example, in order to implement the proposed rule, approval from all consortium members may be needed. In alternative embodiments, in order to implement the proposed rule, approval from a majority or a super majority of consortium members may be needed. In some embodiments, in order to implement the proposed rule, approval from all, a majority, or a super majority of a list of particular consortium members may be needed. In some embodiments, in order to determine whether the approval condition has been met, the computer system accesses data representing previously received approvals and determines whether the previously received approvals is sufficient for the approval condition to have been met.

If the approval condition has not been met, the method returns to 206.

If the approval condition has been met, at 220, the computer system adds an operative program code section corresponding with the proposed rule or proposed program code section representing the proposed rule to a library of operative program code sections in the decentralized network. In some embodiments, adding the operative program code section to the library of operative program code sections in the decentralized network comprises saving the operative program code section in the decentralized network and associating the operative program code section with one or more application programing interfaces (APIs) such that the operative program code section is executable using the decentralized network based at least in part on an API call.

In some embodiments, the computer system may be configured to calculate normalized member scores for the consortium members based on the consortium member scores increased and decreased in response to the particular member's activities regarding, for example, one or more of establishing, proposing, reviewing, commenting on, revising, approving each of the rules of the computing service, and other activities for the computing service or for the particular rule of the computing service.

Figure 3:
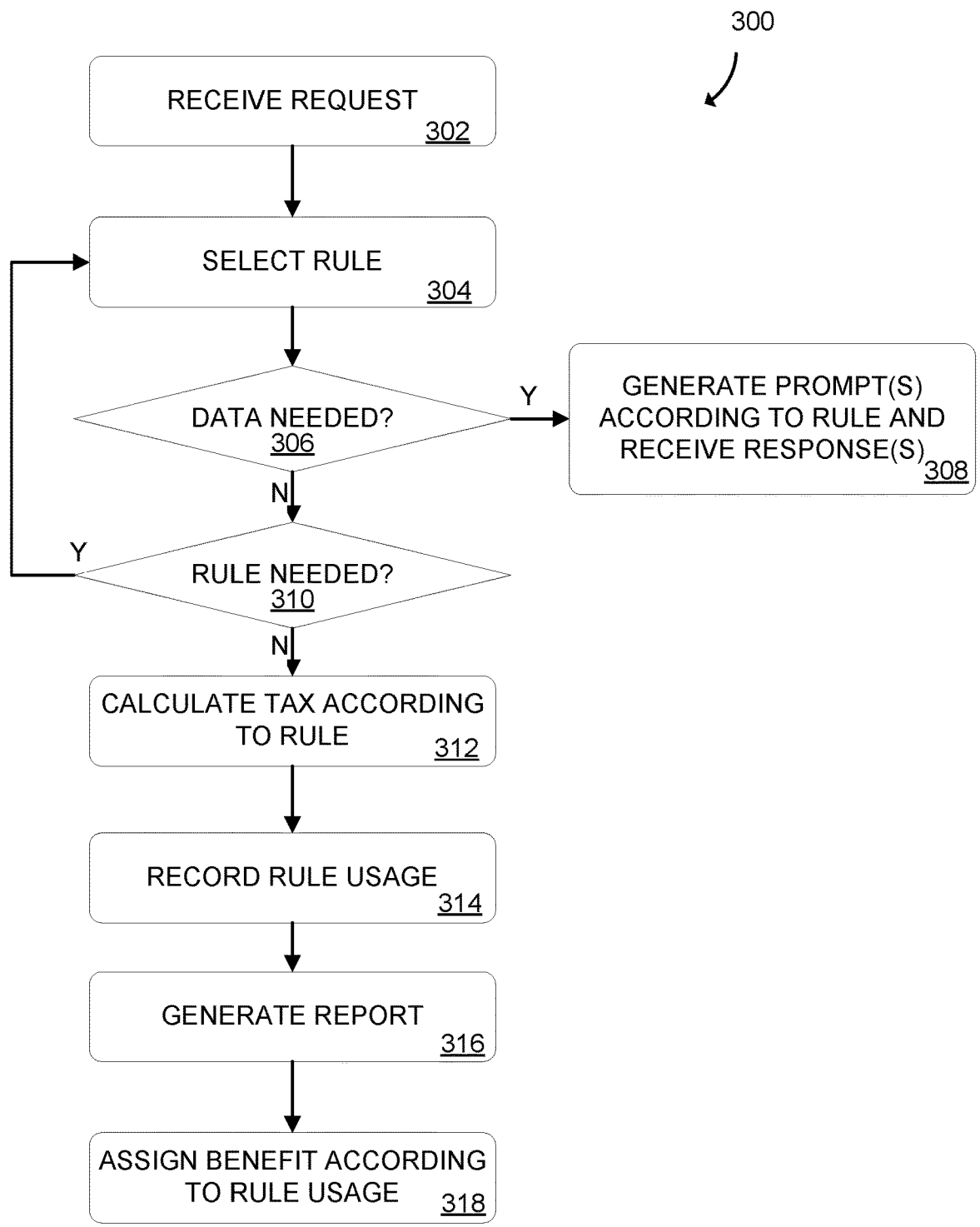
FIG. 3 illustrates an example method for providing a computing service according to some embodiments.

FIG. 3 illustrates an example method 300 for providing a computing service according to some embodiments. The method 300 may, for example, be performed by computer system 108, discussed above.

At 302, the computer system receives data from a third user device associated with a client, where the data indicates a request for a computing service. For example, the data may indicate a request for calculation of an obligation.

At 304, the computer system selects one or more operative program code sections in the library of operative program code sections based at least in part on the request. In some embodiments, the selected operative program code sections are those operative program code sections in the library which are to be used to fulfill the request.

At 306, the computer system determines, based on the request, whether additional information is needed from the third user device to calculate the results expected from the computing service as a result of the request, as understood by those of skill in the art. If no additional information is needed, the method continues to 310.

If additional information is needed, at 308, the computer system generates data representing one or more prompts for the needed additional information, transmits the data to the third user device, and receives responses from the third device, where the responses indicate the needed additional information.

At 310, the computer system determines whether an additional rule is needed, for example, based at least in part on the request, the previously selected rules, and the additional information determined at 308. If an additional rule is needed, the method 300 returns to 304.

If an additional rule is not needed, at 312, the computer system executes the selected operative program code sections to generate a result corresponding with the request for computing service.

At 314 usage of the selected operative program code sections is recorded, for example, in the decentralized network.

At 316, the computer system transmits data corresponding with the result of the execution of the selected operative program code sections to the third user device.

At 318, the computer system calculates a contribution score for the member accounts of each of the members of the consortium who are associated with member scores or normalized member scores for the selected operative program code sections as a result of the consortium member's activities related to the selected operative program code sections. For example, the member scores or normalized member scores for each of the selected or executed operative program code sections may be accessed and may be used to calculate a contribution score for each of the relevant consortium member accounts.

In some embodiments, each of the selected operative program code sections has a relative contribution scoring weight, and the member scores or normalized member scores for each of the selected operative program code sections are adjusted, for example by being multiplied by the corresponding weight. In some embodiments, the adjusted member scores or normalized member scores associated with each of the selected operative program code sections for each particular relevant consortium member are summed. Accordingly, all of the member scores or normalized member scores related the selected operative program code sections for each relevant consortium member related the selected operative program code sections are summed. In some embodiments, the summed adjusted member scores or normalized member scores of all relevant consortium members are normalized, and a normalized contribution score is generated for each relevant consortium member. In some embodiments, the normalized contribution scores are used to calculate compensation for the relevant consortium members, for example, by multiplying each of the normalized contribution scores by a total compensation for the relevant consortium members for the performance of the computing service.

In some embodiments, the decentralized network referenced above is implemented as multiple decentralized networks. Any distribution or segmentation among the decentralized networks for the information recorded in the decentralized networks is contemplated.

Figure 4:
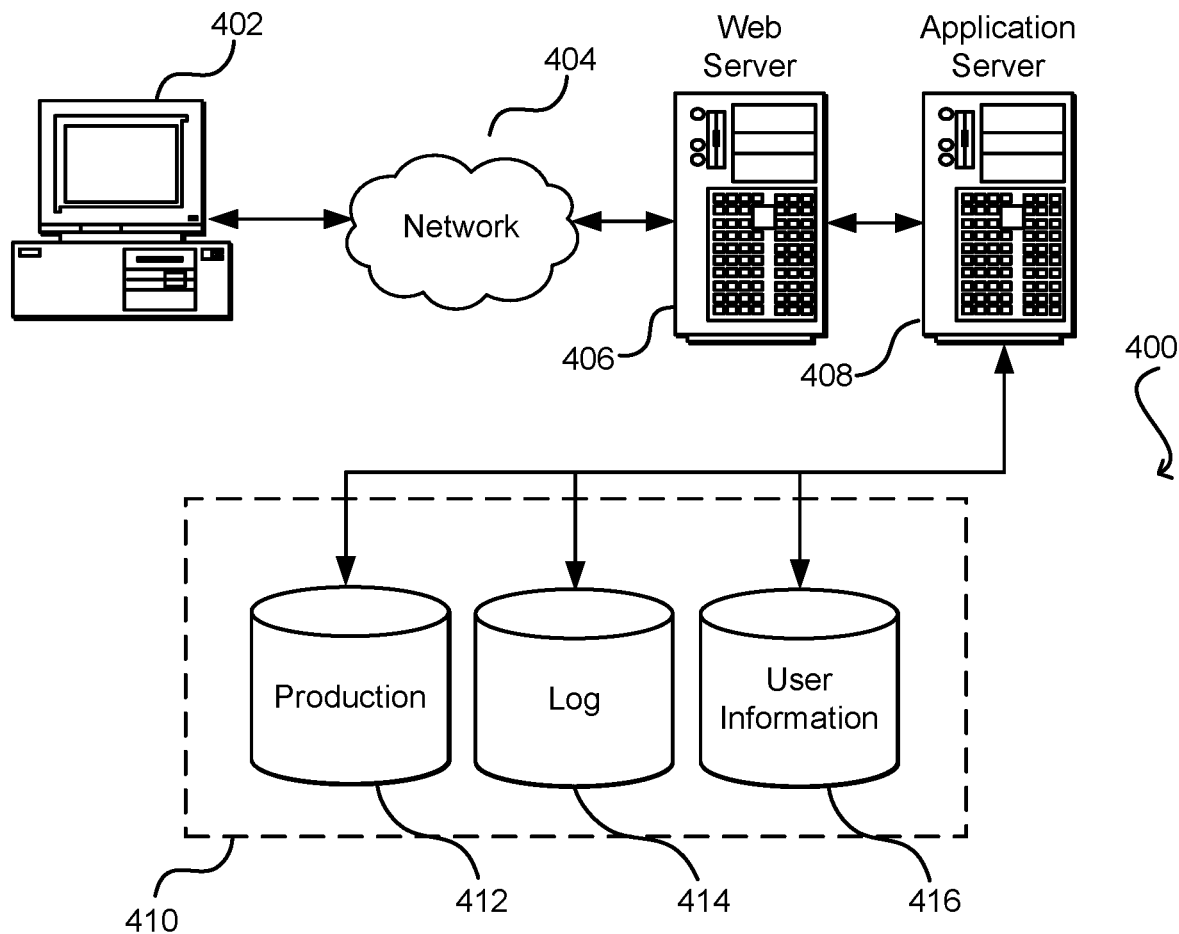
FIG. 4 illustrates an environment in which various embodiments can be implemented.

FIG. 4 illustrates aspects of an example environment 400 for implementing aspects in accordance with various embodiments. As will be appreciated, although a Web-based environment is used for purposes of explanation, different environments may be used, as appropriate, to implement various embodiments. The environment includes an electronic client device 402, which can include any appropriate device operable to send and receive requests, messages, or information over an appropriate network 404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 406 for receiving requests and serving content in response thereto, although for other networks an alternative device serving a similar purpose could be used as would be apparent to one of ordinary skill in the art.

The illustrative environment includes at least one application server 408 and a data store 410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 402 and the application server 408, can be handled by the Web server. It should be understood that the Web and application servers are not required and are merely example components, as structured code discussed herein can be executed on any appropriate device or host machine as discussed elsewhere herein.

The data store 410 can include several separate data tables, databases or other data storage mechanisms and media for storing data relating to a particular aspect. For example, the data store illustrated includes mechanisms for storing production data 412 and user information 416, which can be used to serve content for the production side. The data store also is shown to include a mechanism for storing log data 414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 410. The data store 410 is operable, through logic associated therewith, to receive instructions from the application server 408 and obtain, update, or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 4. Thus, the depiction of the system 400 in FIG. 4 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method implemented by a computer system, the method comprising:
    receiving first data from a first user device, the first data indicating a proposed program code section for a decentralized network, wherein the proposed program code section represents a rule for the decentralized network corresponding with a regulation;
    in response to receiving the first data, increasing a first member score of a first user account associated with the first user device;
    transmitting second data to one or more second user devices wherein the second data indicates the proposed program code section;
    receiving an approval from at least one second user device, wherein the approval indicates that the proposed program code section has been approved;
    in response to receiving the approval:
    increasing a second member score of a second user account associated with the at least one second user device;
    determining that an approval condition has been met for the proposed program code section; and
    adding an operative program code section to a library of operative program code sections in the decentralized network by at least saving the operative program code section in the decentralized network and associating the operative program code section with one or more application programing interfaces (APIs) such that the operative program code section is executable using the decentralized network based at least in part on an API call, the operative program code section corresponding with the proposed program code section;

receiving a request from a third user device for a calculation of an obligation;

based at least partly on the request, selecting the operative program code section from the library of operative program code sections for use in calculating the obligation;

using the operative program code section to calculate the obligation;

increasing a first contribution score of the first user account;

increasing a second contribution score of the second user account; and reporting the obligation to the third user device.

2. The method of claim 1, wherein the request is received via an API of the one or more APIs.

3. The method of claim 1, further comprising, in response to the determining that the approval condition has been met, increasing the first member score of the first user account.

4. The method of claim 2, further comprising:
recording an increase in the second contribution score in the decentralized network; and
recording the increase in the first contribution score in the decentralized network.

5. A system, comprising:
one or more processors; and
a memory storing executable instructions that, upon execution by the one or more processors, cause the system to execute operations to:
receive first data from a first user device, the first data indicating a proposed program code section for a decentralized network, wherein the proposed program code section represents a rule for the decentralized network corresponding with a regulation;
transmit second data to one or more second user devices, wherein the second data indicates the proposed program code section;
receive an approval from at least one second user device, wherein the approval indicates that the proposed program code section has been approved;
update, based at least in part on one or more of the first data or the approval, a user account associated with the first user device or the at least one second user device;
in response to receiving the approval:
determine that an approval condition has been met for the proposed program code section; and
add an operative program code section to a library of operative program code sections in the decentralized network by at least saving the operative program code section in the decentralized network and associating the operative program code section with one or more application programing interfaces (APIs) such that the operative program code section is executable using the decentralized network based at least in part on an API call, the operative program code section corresponding with the proposed program code section;
receive a request from a third user device for a calculation that involves at least in part the operative program code section;
execute, based at least in part on the request, the operative program code section; and
update, based at least in part on execution of the operative program code section, the user account.

6. The system of claim 5, wherein the executable instructions, upon execution by the one or more processors, cause the system to execute operations to:
receive third data from the first user device, the third data indicating a second proposed program code section for the decentralized network, wherein the second proposed program code section represents a second rule for the decentralized network corresponding with a second regulation;
in response to receiving the third data, increase a first member score of a first user account associated with the first user device, wherein the user account is the first user account;
transmit fourth data to one or more of the second user devices wherein the fourth data indicates the second proposed program code section; and
receive a rejection from the at least one second user device, wherein the rejection indicates that the second proposed program code section has been rejected.

7. The system of claim 6, wherein the executable instructions, upon execution by the one or more processors, cause the system to execute operations to, in response to receiving the rejection, record the rejection in the decentralized network.

8. The system of claim 6, wherein the executable instructions, upon execution by the one or more processors, cause the system to execute operations to in response to receiving the rejection, increase a second member score of a second user account associated with the at least one second user device.

9. The system of claim 6, wherein the executable instructions, upon execution by the one or more processors, cause the system to execute operations to:
receive a comment from the at least one second user device, wherein the comment indicates a suggestion for modifying the second proposed program code section; and
in response to receiving the comment, increase a second member score of a second user account associated with the at least one second user device.

10. The system of claim 9, wherein the executable instructions, upon execution by the one or more processors, cause the system to execute operations to, in response to receiving the comment, recording the comment in the decentralized network.

11. The system of claim 9, wherein the executable instructions, upon execution by the one or more processors, cause the system to execute operations to, in response to receiving the comment, recording the increase in the second member score in the decentralized network.

12. The system of claim 5, wherein the executable instructions, upon execution by the one or more processors, cause the system to execute operations to:
receive a response from another user device, wherein the response indicates that the proposed program code section has been reviewed; and
in response to receiving the response, increasing a member score of a user account associated with the other user device.

13. A non-transitory computer-readable storage medium storing computer-executable instructions that, when executed by one or more processors of a computing device, cause the computing device to perform operations comprising:

receiving first data from a first user device, the first data indicating a proposed program code section for a decentralized network, wherein the proposed program code section is associated with a computing service;

transmitting second data to one or more second user devices, wherein the second data indicates the proposed program code section;

receiving an approval from at least one second user device, wherein the approval indicates that the proposed program code section has been approved;

updating, based at least in part on one or more of the first data or the approval, a first user account associated with the first user device or the at least one second user device;

in response to receiving the approval:
 determining that an approval condition has been met for the proposed program code section; and
 adding a first operative program code section to a library of operative program code sections in the decentralized network by at least saving the first operative program code section in the decentralized network and associating the first operative program code section with one or more application programming interfaces (APIs) such that the first operative program code section is executable using the decentralized network based at least in part on an API call, the first operative program code section corresponding with the proposed program code section;

receiving a request from a third user device for the computing service;

based at least partly on the request, selecting the first operative program code section from the library of operative program code sections;

executing the first operative program code section to perform the computing service; and updating, based at least in part on execution of the operative program code section, the first user account.

14. The non-transitory computer-readable storage medium of claim 13, wherein the operations further comprise: recording the execution of the first operative program code section in the decentralized network.

15. The non-transitory computer-readable storage medium of claim 13, wherein the operations further comprise:
 based at least partly on the request, selecting a second operative program code section from the library of operative program code sections in the decentralized network for use in performing the computing service, wherein the second operative program code section is associated with a second user account; and
 executing the second operative program code section to perform the computing service.

16. The non-transitory computer-readable storage medium of claim 15, wherein operations further comprise:
 accessing a member score of the second user account; and
 increasing contribution score of the second user account based in part on the member score.

17. The non-transitory computer-readable storage medium of claim 16, wherein the operations further comprise: increasing a contribution score of the first user account based in part on the member score.

18. The non-transitory computer-readable storage medium of claim 15, wherein the operations further comprise: recording the execution of the second operative program code section in the decentralized network.

19. The non-transitory computer-readable storage medium of claim 15, wherein the operations further comprise: recording an increase in a contribution score of the second user account.

20. The non-transitory computer-readable storage medium of claim 13, wherein the operations further comprise:
 receiving relevant information from the third user device to be used for the computing service, wherein the computing service uses the relevant information.

* * * * *